(12) United States Patent
Rasmussen et al.

(10) Patent No.: US 12,371,894 B2
(45) Date of Patent: Jul. 29, 2025

(54) HANGER ASSEMBLY FOR USE ON OPEN WEB STEEL JOISTS OR BEAMS

(71) Applicants: Michael Allen Rasmussen, Smyrna, DE (US); Geoff Aaron Grantland, Townsend, DE (US)

(72) Inventors: Michael Allen Rasmussen, Smyrna, DE (US); Geoff Aaron Grantland, Townsend, DE (US)

( * ) Notice: Subject to any disclaimer, the term of this patent is extended or adjusted under 35 U.S.C. 154(b) by 221 days.

(21) Appl. No.: 18/456,842

(22) Filed: Aug. 28, 2023

(65) Prior Publication Data

US 2025/0075490 A1 Mar. 6, 2025

(51) Int. Cl.
*E04C 3/02* (2006.01)
*E04B 1/38* (2006.01)
*F16B 7/04* (2006.01)
*F16B 7/22* (2006.01)

(52) U.S. Cl.
CPC ............ *E04B 1/388* (2023.08); *F16B 7/0433* (2013.01); *F16B 7/22* (2013.01); *E04B 2001/389* (2023.08); *E04C 3/02* (2013.01)

(58) Field of Classification Search
CPC .... F16L 3/24; F16B 2/12; F16B 2/065; F16B 7/22; F16B 7/0433; H02G 3/125; E04B 9/006; E04B 1/581; E04B 1/5818
See application file for complete search history.

(56) References Cited

U.S. PATENT DOCUMENTS

| | | | | |
|---|---|---|---|---|
| 2,316,389 A | * | 4/1943 | Atkinson | H02G 3/126 |
| | | | | 220/3.9 |
| 2,470,992 A | * | 5/1949 | Kindorf | F16L 3/24 |
| | | | | 248/72 |
| 2,963,127 A | * | 12/1960 | Manville | E04B 2/56 |
| | | | | 52/693 |
| 3,058,713 A | | 10/1962 | Nemire et al. | |
| 3,469,810 A | * | 9/1969 | Dorris | F16B 2/12 |
| | | | | 248/245 |
| 4,753,014 A | | 6/1988 | Vrajich | |
| 4,791,969 A | | 12/1988 | Cinque | |
| 4,805,855 A | | 2/1989 | Kirby | |
| 5,029,794 A | * | 7/1991 | Wolfe | F21V 21/04 |
| | | | | 362/148 |
| 5,947,424 A | * | 9/1999 | Heath | F16B 21/16 |
| | | | | 248/58 |
| 6,126,156 A | | 10/2000 | Brodeur | |
| 6,935,821 B2 | | 8/2005 | Bodin et al. | |
| 7,429,025 B1 | | 9/2008 | Gretz | |
| 7,673,427 B2 | | 3/2010 | Morey | |

(Continued)

*Primary Examiner* — Brian E Glessner
*Assistant Examiner* — Daniel J Kenny
(74) *Attorney, Agent, or Firm* — Dunlap Bennett & Ludwig, PLLC

(57) ABSTRACT

A construction hanger having two nested clamping frames that slide relative to each other in a disengaged condition to selectively define a throat distance between two stop edges provided by the two nested clamping frames, respectively. An engageable fastener enables a user to set and secure a desired throat distance by way of an engageable fastener that directly connects the two nested clamping frames in an engaged condition. A rod nut may be sandwiched between the two nested clamping frames so that a threaded rod can engage and thereby move the construction hanger to a desired location along a joist or beam.

6 Claims, 3 Drawing Sheets

(56) References Cited

U.S. PATENT DOCUMENTS

| | | | |
|---|---|---|---|
| 7,673,841 B2* | 3/2010 | Wronski | F21S 8/026 |
| | | | 248/200.1 |
| 7,726,614 B2* | 6/2010 | Redecker | F16B 2/065 |
| | | | 248/220.21 |
| 7,780,132 B1 | 8/2010 | Tomaric | |
| 7,967,272 B2 | 6/2011 | Nilsen et al. | |
| 8,100,369 B2 | 1/2012 | Osborn et al. | |
| 8,337,037 B2 | 12/2012 | Hopkins | |
| 8,480,041 B2* | 7/2013 | Myers | F16L 3/1211 |
| | | | 248/228.3 |
| 8,776,469 B2 | 7/2014 | Morey | |
| 8,931,747 B2* | 1/2015 | Davis | F16M 13/02 |
| | | | 248/228.3 |
| 9,963,858 B2* | 5/2018 | Bors | F16L 3/16 |
| 9,989,171 B2* | 6/2018 | Beelen | F16L 3/20 |
| 9,995,430 B2* | 6/2018 | Miller | A63J 1/02 |
| 10,006,613 B2* | 6/2018 | Oudina | F21V 21/048 |
| 11,047,408 B2* | 6/2021 | Roman | F16B 2/065 |
| 11,764,559 B2* | 9/2023 | Garvin | H02G 3/125 |
| | | | 174/58 |
| 2003/0006353 A1 | 1/2003 | Dinh et al. | |
| 2006/0254190 A1 | 11/2006 | Hunt | |
| 2017/0229852 A1* | 8/2017 | Jones | F16M 13/022 |

\* cited by examiner

HANGER ASSEMBLY FOR USE ON OPEN WEB STEEL JOISTS OR BEAMS

BACKGROUND OF THE INVENTION

The present invention relates to safe and quick installation of hangers/clamps from open web steel joists and, more particularly, to a construction hanger and a method of installing the same.

In the construction industry open web steel joists or beams are typically used as ceiling and/or roof framing. These same open web steel joists or beams are also used to hang equipment such as pipe clamps, cable trays, HVAC ductwork, plumbing fixtures, lighting fixtures, and the like. Currently, a beam clamp hanger or similar device is attached to the support joist or beam for attachment to such objects to be supported by the joist or beam.

Existing beam clamp hangers, however, take time to install as they must be installed one at a time from ladders or lifts. This current installation process creates both the risk of falling by the installer as well as incorrect or suboptimal installation which in turn can cause the beam clamp hangers to become insecure or fail. Thus, current installation methods are time-consuming and unsafe. Furthermore, current beam clamp hangers cannot easily be relocated if the desired fixed location of the hung object changes.

As can be seen, there is a need for a hanger and a method of installing the same that is faster and more secure than the prior art, merely through the turning of a screw that can be done by the installer at a distance well beyond their arms' length during the installation or removal process.

SUMMARY OF THE INVENTION

The present invention provides a faster and more secure way to install hanging rods from open web steel joists compared to the prior art. The present invention enables a user to engage in the installation process while standing on the ground ten feet or more below the supporting open web steel joist, thereby eliminating the need for ladders or lifts in some instances. The present invention also enables adjustment of the secured hanger from the ground level, further improving safety in the workplace.

In one aspect of the present invention, a construction hanger providing the following: an inner channel; an outer channel dimensioned and shaped so that the inner and outer channels form a nested position; and each channel comprising a web having: an engagement point inward of one end; and an adjustment slot along another end, wherein in the nested position the engagement point of one channel aligns with the adjustment slot of the other channel, and where in the nested position, each channel provides one of two opposing stop edges, respectively, and wherein one of the two opposing stop edges is defined by a hook portion.

In another aspect of the present invention, the construction hanger further includes the following: wherein the said channels slide relative to each other in a disengaged condition so that a distance between the two opposing stop edges is selectively adjustable; further including an engageable fastener extendable through one of the two adjustment slots so as to engage the engagement point of the other channel, wherein an engaged condition between said channels is formed from the disengaged condition; further including a rod nut having a threaded conduit with a head on one end thereof, wherein the head is disposed on one side of the web of the outer channel wherein the threaded passageway is substantially disposed on the other side of said web; and further including a threaded rod dimensioned and shaped to threadably engage the threaded passageway so that in the engaged condition the construction hanger can be moved.

In yet another aspect of the present invention, a method of installing the above-mentioned construction hanger on an overhead steel joist, when the overhead steel joist is beyond arm's length of the installer, the method including the following: forming the engaged condition after adjusting a distance between the two opposing stop edges to snugly engage opposing surfaces of the overhead steel joist; and moving said construction hanger, by way of the threaded rod engaging the rod nut, to a desired location along the overhead beam, whereat the hook portion engages one of the two opposing surfaces of the overhead steel joist.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a construction hanger having two nested clamping frames that slide relative to each other in a disengaged condition to selectively define a throat distance between two stop edges provided by the two nested clamping frames, respectively. An engageable fastener enables a user to set and secure a desired throat distance by way of an engageable fastener that directly connects the two nested clamping frames in an engaged condition. A rod nut may be sandwiched between the two nested clamping frames or securely attached in another manner such as welding or friction drilling so that a threaded rod can engage the rod nut, thereby selectively moving the construction hanger to a desired location along a joist or beam.

Referring to FIGS. 1 through 5, the present invention embodies a hanger assembly 100 adapted to be hung from or otherwise attached to an open web steel joist or beam 34. Beam 34 may be of any type found in the construction industry including the bar joist depicted in the Figures, wherein the open web steel joist or beam 34 has a flange 36 with opposing lateral edges 38.

Figure 1:
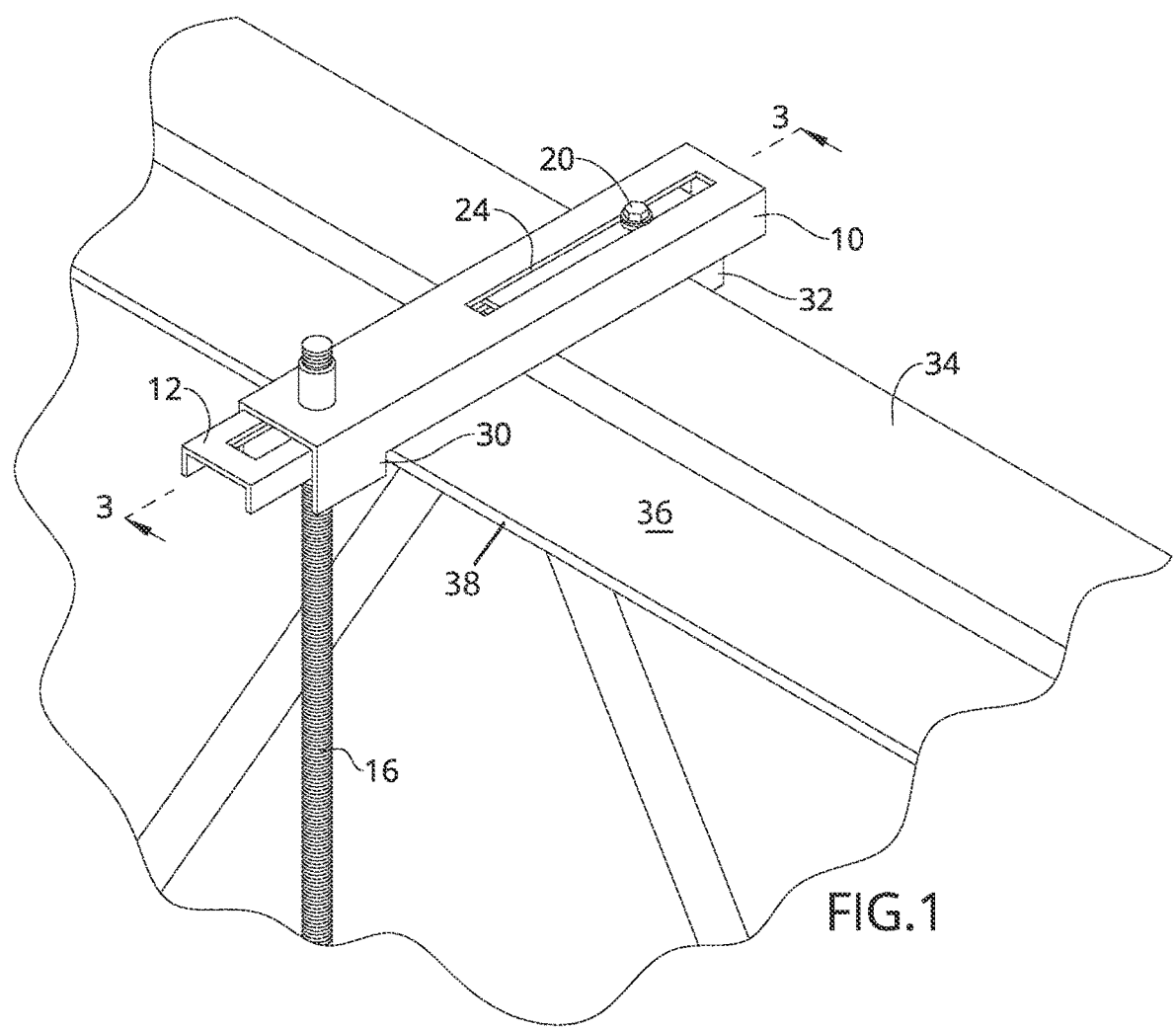
FIG. 1 is a perspective view of an exemplary embodiment of the present invention, shown in use being installed.
Figure 2:
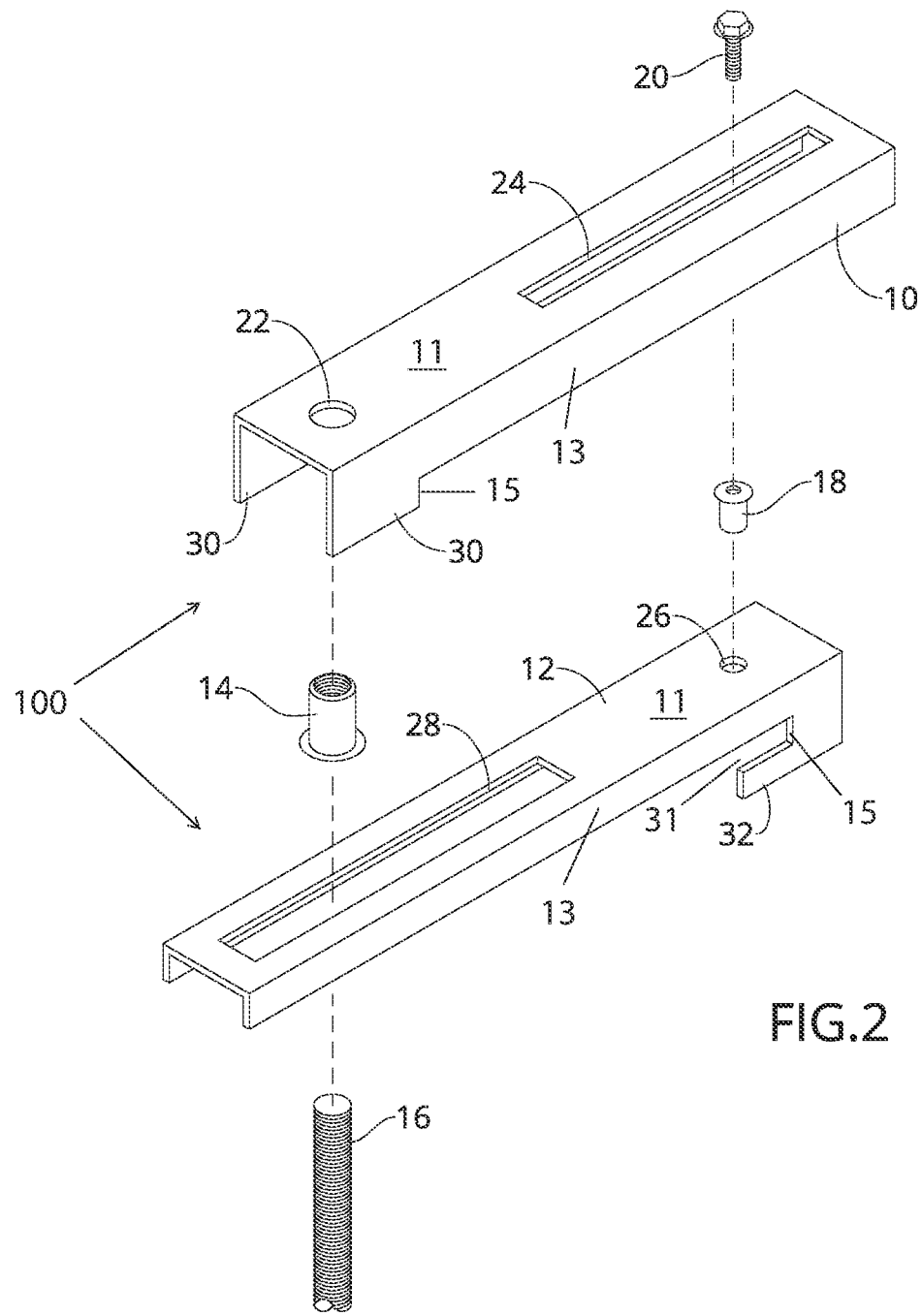
FIG. 2 is an exploded perspective view of FIG. 1.
Figure 3:
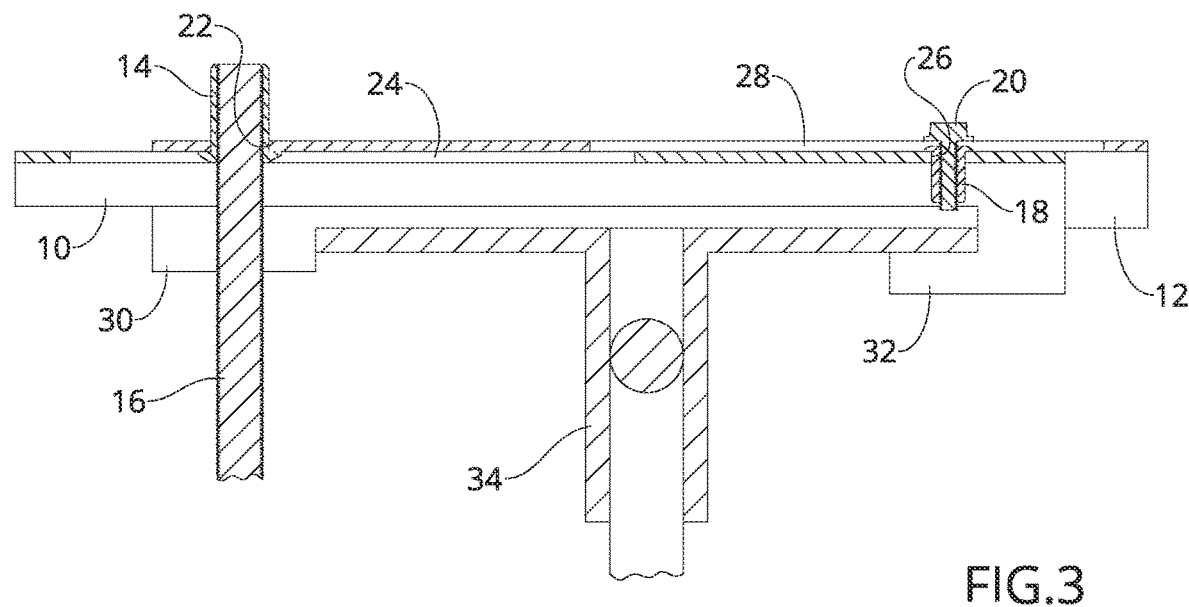
FIG. 3 is a section view of an exemplary embodiment of the present invention, taken along line 3-3 in FIG. 1, illustrating a direct connection between an outer channel 10 and an inner channel 12—i.e., forming an "engaged condition"—by way of engageable fasteners 20, 18.
Figure 4:
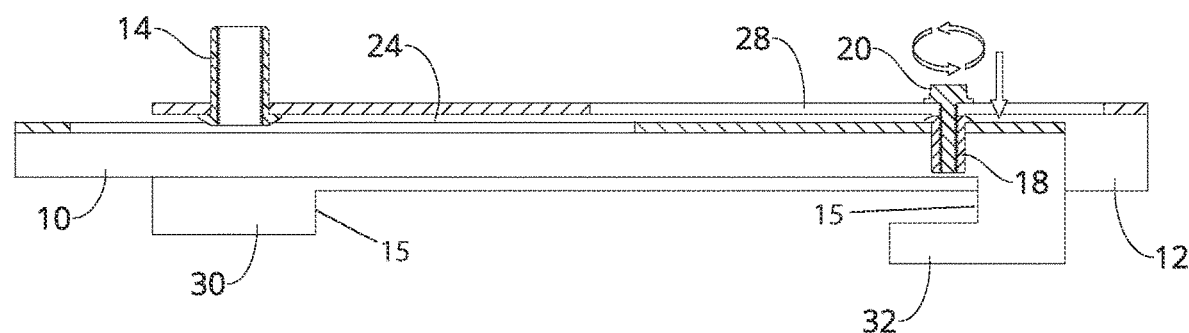
FIG. 4 is a section view of an exemplary embodiment of the present invention, like FIG. 3, illustrating moving the engageable fasteners 20, 18 from an engaged position to a disengaged position, thereby moving the engaged condition (direct connection) between the outer and inner channels 10, 12 to a disengaged condition, which in turn enables the outer and inner channels 10, 12 to move relative to each other.
Figure 5:
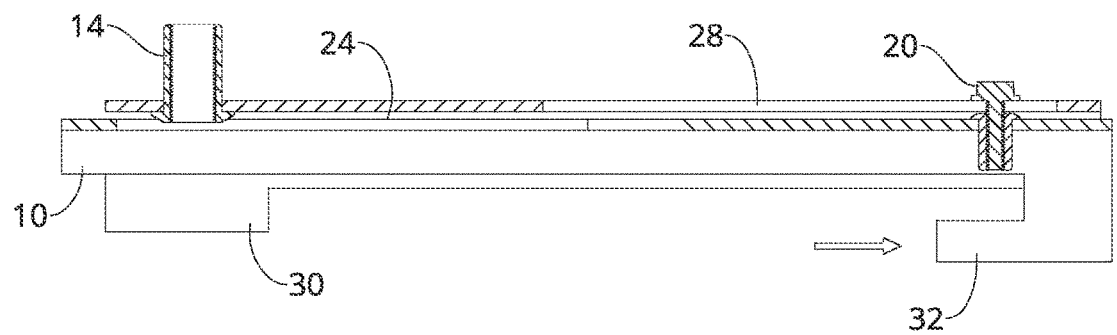
FIG. 5 is a section view of an exemplary embodiment of the present invention, like FIG. 3, illustrating selective adjustment of a distance between the opposing stop edges 15 of the bracket legs 30 and hook 32, when the hanger assembly 100 is in the disengaged condition.

The hanger assembly 100 includes an outer channel 10 and an inner channel 12, wherein the inner channel 12 is dimensioned to nest in the outer channel 10 as shown in the Figures. Each channel 10, 12 has a first end and an opposing second end, wherein the first end is depicted in FIGS. 3 through 5 as being on the left-side of each respective Figure, and the second end is depicted on the right-side thereof. Each channel 10, 12 may be an elongated C-channel with a web 11 having two flanges 13 projecting in the same orthogonal (relative to the web 11) direction, with one of the two flanges 13 along each of the two opposing longitudinal edges of the web, respectively.

In one embodiment, the first end of the outer channel 10 provides a fastener hole 22 through its web 11 just inward the first end. The flanges 13 along the first end of the outer channel 10 provide bracket legs 30, thereby defining a stop edge 15 facing the second end. Along the second end of the outer channel 10 is an elongated slot 24 provided in the web 11. Furthermore, the inner channel 12 provides a fastener hole 26 just inward of the second end of the inner channel 12, while the flanges 13 along the second end of the inner channel 12 provides a hook 32 for engaging a lateral edge 38 of the beam flange 36. This hook 32 defines a stop edge 15 facing the first end. The first end of the inner channel 12 provides an elongated slot 28 along its web 11.

The inventive concept of the present invention is that two frames may slidably engage to linearly move relative to each other and so that together the two frames provide two opposing surfaces/stop edges 15, thereby defining an opening through which the joist flange 36 may be received. Typically, but not necessarily, one of the two opposing surfaces/stop edges 15 are provided by one frame, while the other two opposing surfaces/stop edges 15 is provided by the other frame.

One or both frames provide a mechanism for selectively urging the two opposing surfaces/stop edges 15 toward or away from each other to securely clamp or unclamp the opposing lateral edges 38 of the beam 34, by changing the distance between the two opposing surfaces/stop edges 15.

The channels/frames 10, 12 may be made of various gauge materials depending on the application, including stainless steel, galvanized steel, polycarbonate, or any other material suitable for the desired application, and includes engageable fasteners 20, 18 for adjusting the distance between the opposing surfaces/stop edges 15—e.g., the length of the throat of the clamping jaw of the hanger assembly 100.

The engageable fasteners 20, 18 may be a set screw, rivet nut and head screw, weld nuts, etc., wherein an inner engageable fastener 18 seats in the inner fastener hole 26 while the outer engageable fastener 20 slides through the outer elongated slot 24 so that the outer engageable fastener 20 can be set in the inner engageable fastener 18 in the engaged condition and moved to the disengaged condition by disengaging from the inner engageable fastener 18.

The outer channel 10 is dimensioned and shaped to fit over the inner channel/clamp frame 12. In such a nested position, a rod nut 14, or other suitable threaded nut attached by welding or friction, extends through the inner elongated slot 28 so that the head of the rod nut 14 faces away from the outer channel 10, while the distal end of the rod nut 14 extends through the outer fastener hole 22. The rod nut 14 provides an inner threaded passageway dimensioned and shaped to rotatably receive a threaded rod 16 used to install the hanger assembly 100.

A method of using the present invention may include the following. The hanger assembly 100 disclosed herein may come pre-assembled, in the engage condition, and ready to have the length of the throat be adjusted to the desired width to fit any standard size steel joist 34. A user would first determine the width of the joist 34 (i.e., the distance between the opposing lateral edges 38 of the joist 34. Then loosen the engageable fasteners 20, 18 to the disengaged condition on the hanger assembly 100 and adjust the width/length between the opposing stop edges 15 to the size of your bar joist 34. Then the installer re-tightens the engageable fasteners 20, 18—forming the engaged condition—after the opposing stop edges 15, engage the opposing lateral edges 38, respectively. The user would thread at least ½" of a distal end of the threaded rod 16 through the bottom of the rod nut 14 on the underside of the web 11 of the inner channel 12. This lever of engagement allows the installer to move the hanger assembly 100 solely by way of the threaded rod 16. Accordingly, the installer may be standing on the ground over ten feet away from the steel joist.

Using the engaged threaded rod 16 to position the hanger assembly 100 over the top of your joist so that the hook void 31 slidably receives the flange 36. Then the installer may tighten the rod nut 14 via the threaded rod 16 so that it contacts the ceiling above the joist and secures the hanger assembly 100 in place. Then one can install a desired hanging device or equipment.

A method of manufacturing the present invention may include the following. The inner and outer clamp components may be cut out or otherwise formed of the desired material type and thickness using either stamps, laser or plasma cutting tools, additive manufacturing, or other appropriate methods. The components are then bent to the specified widths so they can be nested inside of each-other and slide freely back and forth. The components are separated and an appropriately sized engageable fastener and rod nuts are installed in the hole for the set screw and another installed in the hole for the hanging threaded rod. The components are then reassembled, and a set screw 20 is inserted through the outer elongated slot 24 on the outer channel 10 and into the set screw/engageable fastener nut 18 on the inner channel 12. The set screw 20 is tightened to stay in place yet allow the clamp components to selectively slide freely back and forth by the installer.

A steel cap nut or rubber bumper could be installed on top of the threaded rod after it has been threaded into place to provide additional support when tightened against the roof of the structure above the bar joist. If there is no roof above the bar joist, a second appropriately sized nut could be threaded onto the rod from the top and tightened against the rod nut to provide additional support.

An additional retaining clip can be installed between the hanger assembly 100 and appropriately sized nuts on the threaded rod below the assembly to allow the clip to be secured into place when the rod is tightened and provide additional support to the underside of the steel joist to reduce the likelihood of the hanger lifting out of place under vibration.

The material used for the hanger assembly 100 can be adjusted to accommodate different environmental uses (stainless steel for wet environments for example). For heavier applications, larger diameter set screws and threaded rod nuts could be used to accommodate larger diameter hanging rods.

The present invention enables installers to install hanging devices quickly, easily and securely without the need for ladders or man lifts, and with no specialized tools or equipment. Remove the hanger from the package and loosen the set screw to allow the clamp to be adjusted to the width desired for your steel joists. The clamp accommodates all standard size steel joists on the market.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A construction hanger comprising:
   an inner channel;
   an outer channel dimensioned and shaped so that the inner and outer channels form a nested position; and
   each channel comprising a web having:
      an engagement point inward of one end; and
      an adjustment slot along another end, wherein in the nested position the engagement point of one channel aligns with the adjustment slot of the other channel, and where in the nested position, each channel provides one of two opposing stop edges, respectively, and wherein one of the two opposing stop edges is defined by a hook portion.

2. The construction hanger of claim 1, wherein the said channels slide relative to each other in a disengaged condition so that a distance between the two opposing stop edges is selectively adjustable.

3. The construction hanger of claim 2, further comprising an engageable fastener extendable through one of the two adjustment slots so as to engage the engagement point of the other channel, wherein an engaged condition between said channels is formed from the disengaged condition.

4. The construction hanger of claim 3, further comprising a rod nut having a threaded passageway with a head on one end thereof, wherein the head is disposed on one side of the web of the outer channel wherein the threaded passageway is substantially disposed on the other side of said web.

5. The construction hanger of claim 4, further comprising a threaded rod dimensioned and shaped to threadably engage the threaded passageway so that in the engaged condition the construction hanger can be moved.

6. A method of installing a construction hanger of claim 5 on an overhead joist or beam, when the overhead joist is beyond arm's length of the installer, the method comprising:
   forming the engaged condition after adjusting a distance between the two opposing stop edges to snugly engage opposing surfaces of the overhead joist or beam; and
   moving said construction hanger, by way of the threaded rod engaging the rod nut, to a desired location along the overhead joist or beam, whereat the hook portion engages one of the two opposing surfaces of the overhead joist or beam.

* * * * *